United States Patent [19]

Impink, Jr. et al.

[11] Patent Number: 5,068,080
[45] Date of Patent: Nov. 26, 1991

[54] OPERATION STATE RESPONSIVE AUTOMATIC DISPLAY SELECTION SYSTEM

[75] Inventors: Albert J. Impink, Jr., Murrysville; Melvin H. Lipner, Monroeville, both of Pa.

[73] Assignee: Westinghouse Electric Corp., Pittsburgh, Pa.

[21] Appl. No.: 307,831

[22] Filed: Feb. 7, 1989

[51] Int. Cl.$^5$ ............................................. G21C 7/36
[52] U.S. Cl. .................................... 376/215; 376/217; 364/550
[58] Field of Search ....................... 376/215, 216, 217; 364/550

[56] References Cited

U.S. PATENT DOCUMENTS

| | | | |
|---|---|---|---|
| 4,292,129 | 9/1981 | Barry | 376/217 |
| 4,657,727 | 4/1987 | Mlynczak et al. | 376/217 |
| 4,668,465 | 5/1987 | Boomgard et al. | 376/216 |
| 4,803,039 | 2/1989 | Impink et al. | 376/216 |
| 4,815,014 | 3/1989 | Lipner et al. | 376/216 |

OTHER PUBLICATIONS

M. H. Lipner, R. A. Mundy, A. J. Impink, Jr., C. E. Meyer, "A Computerized Emergency Procedures System for a Pressurized Water Reactor," *Proceedings of the International Topical Meeting on Computer Applications for Nuclear Power Plant Operations and Control*, Sep. 1985.

M. H. Lipner, R. A. Mundy, A. J. Impink, Jr., R. G. Orendi, "A Computerized Procedures System for Enhanced Plant Operation," *Proceedings of the American Power Conference*, Apr. 1986.

M. H. Lipner, R. G. Orendi, A. J. Impink, Jr., R. A. Mundy, "A Computerized System for Improved Management and Execution of Plant Procedures," *Proceedings of the Topical Meeting on Artificial Intelligence and Other Innovative Computer Applications in the Nuclear Industry*, Sep. 1987.

*Primary Examiner*—Thomas H. Tarcza
*Assistant Examiner*—David Cain
*Attorney, Agent, or Firm*—M. G. Panian

[57] ABSTRACT

The present invention is a computer based system supporting plant operators in caring out nearly routine operations. The computer based system monitors available plant instrumentation signals and processes the gathered information to detect satisfaction of initial conditions to the state change. Once the state change is started, the system then compares the sequence of observed changes in the plant with a preprogrammed sequence and alerts the operators to any undesirable deviations from the preplanned sequence by providing appropriate attention grabbing displays on a system monitor. The system also continuously monitors constraining conditions and alerts the operator when the system moves toward an undesired state. The system requires no input from the operator when the operation underway is following the prescribed sequence and minimal input from the operator when a deviation is detected. The system internally and automatically tracks the evolution of plant states during the nearly routine operations.

9 Claims, 11 Drawing Sheets

Microfiche Appendix Included
(1 Microfiche, 19 Pages)

OPERATION STATE RESPONSIVE AUTOMATIC DISPLAY SELECTION SYSTEM

MICROFICHE APPENDIX

A microfiche appendix is included herewith which contains one fiche and nineteen total frames.

CROSS REFERENCE TO RELATED APPLICATIONS

The present invention is related to allowed U.S. Pat. Nos. 4,803,039 and 4,815,014 respectively filed on Feb. 3, 1986 and Feb. 27, 1987 both of which are incorporated by reference herein.

BACKGROUND OF THE INVENTION

1. Field of the Invention

The present invention is directed to a digital computer based system for selecting information to be presented to an operator of a processing facility as he executes complex operations and, more particularly, to a system in which the automatic selection of new displays of information is internally triggered by detected changes in plant state that occur as a result of the ongoing operations and where the selection process is guided by the observed sequence of such plant state changes.

2. Description of the Related Art

U.S. Pat. Nos. 4,803,039 and 4,815,014 teach the basic concepts underlying a system for computer based monitoring of the execution of complex procedures. It is recognized that such a system is primarily intended for use under circumstances in which the operator of a complex processing facility is faced with an unusual, adverse situation with little or no prior experience therein. Under such circumstances the operator has little choice but to rely heavily on, and follow closely, pre-planned, written procedures, defined usually by the systems' designers, in order to attempt to restore critical system functions. In such cases frequent interaction between the operator and a computer based monitor of procedures execution, such as the system referenced above, is highly desirable if undesirable consequences are to be avoided.

In another class of more commonly encountered operating situations the operator of a complex processing facility performs a nearly routine operation. The startup after shutdown of a large electrical generating plant, which might typically occur several times a year, is representative of this class of situations. These situations inevitably involve programmed sequences of changes in the state of the plant. These changes in state may be as pervasive as changes in temperature or pressure of a working fluid or as simple as the opening or closing of a valve, or the starting or stopping of a pump. By ordinary and broadly accepted industry standards and practices such changes in state are monitored and may serve to trigger the next step in the human controlled evolution of the operation being carried out. The operator usually has had prior experience in such situations, but by reason of infrequency of occurrence he may not remember every detail of the sequence of operations to be performed. Such situations are not hazardous and in general pose no threat to the health and safety of either the operators or the general public. They are of interest to the owners and managers of the affected facilities because errors made in the execution of the operations can be quite costly in terms of lost production and in equipment damage resulting from incorrect sequencing of consecutive operations.

Written procedures or a preplanned sequence of operations to guide the operator in efficiently executing the desired nearly routine sequence of operations commonly exist in complex processing facilities. Nonetheless, costly operator errors occasionally occur as a result of an operator's misunderstanding of particular parts of the applicable procedure or of inadvertent omission of one or more steps of the procedure. Hence, the use of a computer based system for monitoring the execution of such nearly routine sequences of operations can again offer valuable benefits.

Attempts to apply the system of the above-identified applications to this class of operations where the operator is nominally familiar with the course of actions to be followed have consistently shown that such systems are too rigorous and too demanding of operator interactions to be fully practical.

SUMMARY OF THE INVENTION

It is an object of the present invention to provide a computer based system which has the ability to utilize internal recognition of successive changes in monitored system state to stay in step with the actual execution of a currently applicable sequence of operations.

It is a further object of the present invention to provide a system which detects impending or just committed operator errors and automatically provides output displays alerting the operator to the deviation from the sequence of operations along with other displays showing the evolution of the affected plant systems.

It is an additional object of the present invention to provide a monitoring system which automatically generates a textural display indicating a deficiency in the accomplishment of a step in an operation, detailing the evidence that identifies the deficiency and setting forth the actions needed to rectify the situation.

It is also an object of the present invention to provide a system which when the operator has completed corrective actions, confirms completion of the previously deficient step and automatically passes to consideration of the next step in sequence.

It is an object of the present invention to provide a computer based system which effectively assists in the execution of nearly routine operations of a plant which provides minimally obtrusive support to the plant operators in carrying out a prescribed evolution of plant states.

It is still another object of the present invention to transfer at least part of the burden of continuously monitoring peripheral aspects of the evolution of a plant from the human operator to a computer.

It is also an object of the present invention to automatically collect, organize and present information relative to the current transition in plant state in a single convenient location and to automatically document the process as it evolves.

The above objects can be accomplished by a computer based system for supporting plant operators in carrying out prescribed nearly routine procedures or a preplanned sequence of operations. The computer based system monitors available plant instrumentation signals and processes the gathered information to detect successive changes in plant state. The system then compares the sequence of observed changes in plant state with a preprogrammed sequence and draws the operators attention to any undesirable deviations from the preplanned sequence by providing appropriate displays on a system monitor. The system requires no input from the operator when the operation underway is following the prescribed sequence and minimal input from the operator when a deviation is detected. The system internally and automatically tracks the evolution of plant states during the nearly routine operations.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
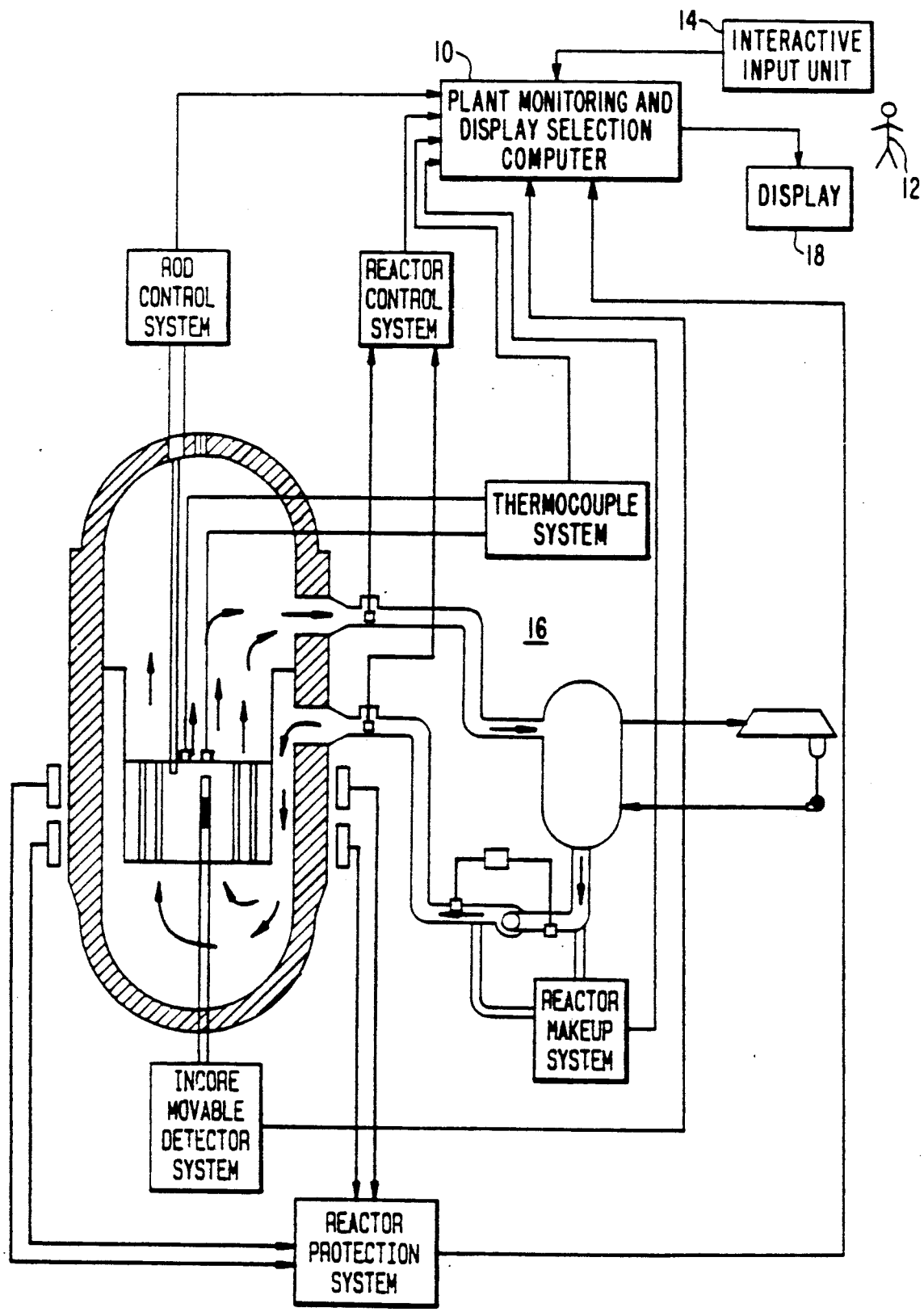
FIG. 1 illustrates a plant monitoring and control computer into which the present invention is incorporated.

The present invention is incorporated into a plant monitoring and display selection computer 10 such as described in U.S. Pat. Nos. 4,803,039 and 4,815,014 and illustrated in FIG. 1. The plant operator 12 through an interactive input unit 14, such as a keyboard, can provide appropriate inputs to the computer 10 to initialize and initiate the monitor process as the plant 16 is started moving from one state to another state in accordance with a prescribed printed procedure or sequence or preplanned sequence of operations available to the operator 12 or in accordance with an unwritten but preplanned operation sequence previously learned or developed by the operator or system designer. The operator has the capability of monitoring the sequence of events that occur during the desired change of state via a display 18. The present invention will allow the operator to proceed with the state change procedure using other input units such as a plant control board while the computer 10 automatically monitors plant instrumentation, processes the instrumentation data to detect successive steps in the plant change of state, compares the observed steps in the plant change with the prescribed sequence and, via the display 18 and other alerting devices such as an audible annunciator bring the operator's 12 attention to any deviations from the prescribed sequence.

In order for the computer 10 to monitor the changes which should be occurring in the plant 16, the prescribed procedure that the operator is to follow must be resolved into a sequence of changes in plant state that occur. Each step in the sequence of changes in state must then be reviewed and analyzed to ensure that the available plant instrumentation is adequate to detect the change in state. Finally, the several changes in state are divided into four different categories. These categories are: initial conditions which must be satisfied before the evolution from one state to another state can be started; sequential conditions which are the progressive plant states which are to be encountered in the transition toward the final intended plant state; constraining conditions which are enforced during the evolution through the successive plant states and are intended to keep the change of state within prescribed boundaries; and final conditions which must be satisfied before the evolution to the desired state can be determined as completed. Of the above four conditions, initial conditions and final conditions can be treated in the same manner. Once the categories and inputs are determined, the designer develops a flowchart from which a program can be produced in a commonly used high level language such as Fortran.

Figure 2:
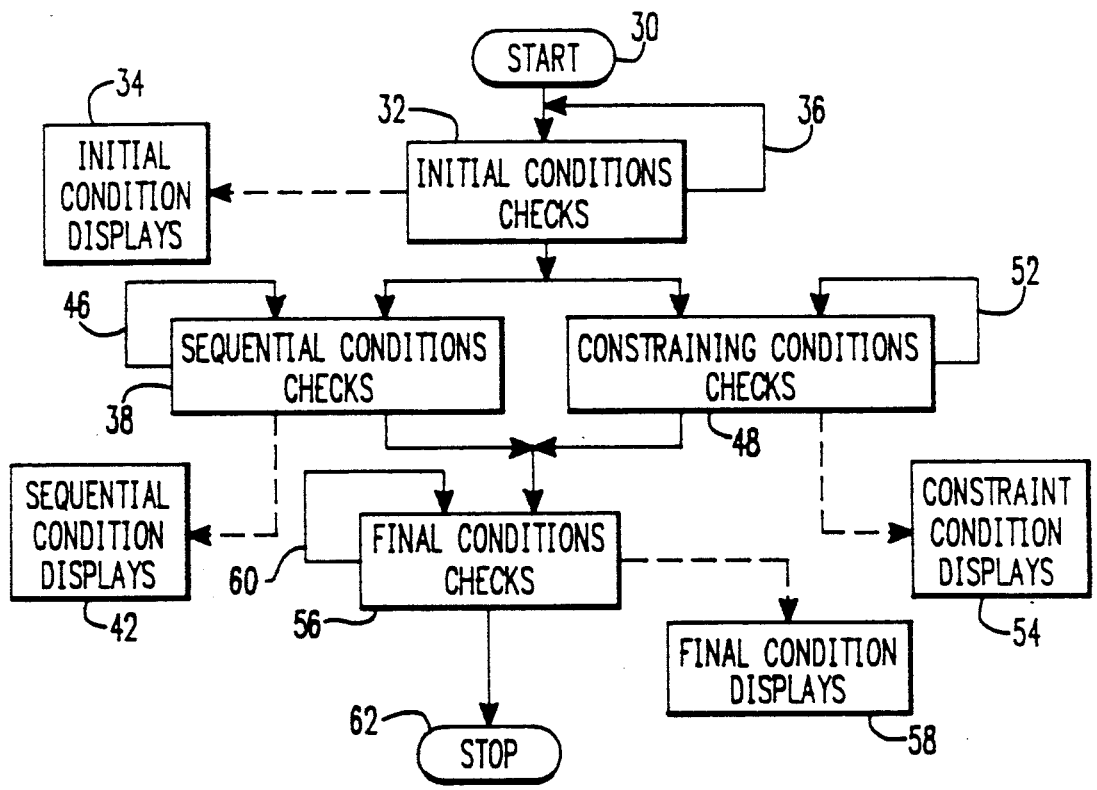
FIG. 2 illustrates the conceptual organization of the checks of the present invention.

By dividing the individual changes in state into the categories of initial, sequential, constraining and final conditions the organization of the final computer program, can be as illustrated in FIG. 2. The present invention is initiated 30 when the operator begins the transition or evolution from a current plant state to some desired future plant state. As previously mentioned before the state changes can be started initial conditions checks 32 must be performed. Because modern digital computers are extremely fast it is possible, and sometimes desirable, to have the computer perform all of the initial condition checks in a continuously executing loop as depicted in FIG. 2. In such a loop whenever one or more of the initial condition checks 32 are satisfied a bypass path is taken which bypasses the monitoring and condition checking necessary for that particular condition check. If all the conditions are not satisfied initial condition displays 34 are produced and a loopback path 36 is taken until all initial condition checks are satisfied. When all of the initial condition checks 32 are satisfied, a multi-tasking operation is commenced in which sequential condition checks 38 and constraining condition checks 48 are performed concurrently.

As each one of the sequential condition checks is satisfied a bypass path around the condition check can also be taken. When the sequential condition checks are not satisfied sequential condition displays 42 are produced for operator guidance. The sequential condition checks are continuously executed by execution control following the loopback path 46 which causes all checks in the system not bypassed to be periodically re-executed. As an alternative, in the sequential condition checks, when a particular condition must be satisfied before further progress in the state change can be accomplished a loopback path on that condition can be provided.

In parallel with the sequential condition checks 38, constraining checks 48 are performed. Once again when the constraining checks are properly satisfied a bypass path within the group of checks can be followed. When the constraining condition checks 48 are not satisfied a loopback path 52 for constraints which must be satisfied can be taken. Whenever the condition checks for constraints are not satisfied displays 54 devoted to informing the operator about unsatisfied constraints are produced. Prior to arrival at the desired state, final condition checks 56, which are conceptually the same as initial condition checks 32, are performed and appropriate final condition deficiency displays 58 are provided if necessary. Once again if the final checks are not satisfied a loopback path 60 is taken until all are satisfied.

Figure 3:
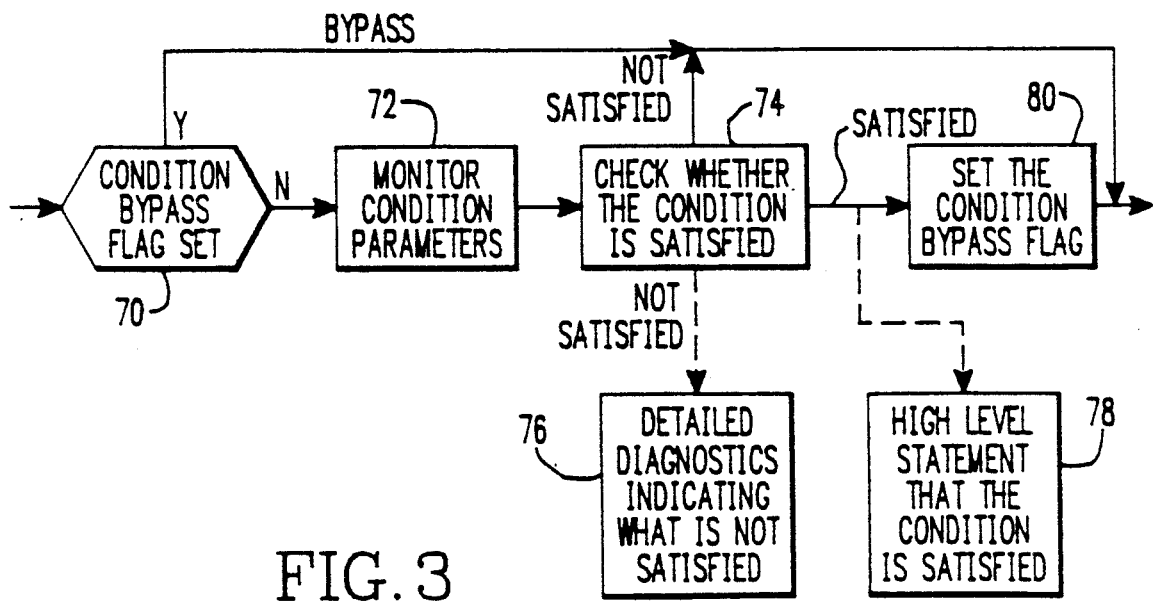
FIG. 3 is a generic flowchart building block for checking initial or final conditions.

Initial conditions and final conditions are, by their nature, static and once verified as being satisfied need not be considered again. These types of conditions can be thought of as parallel rather than sequential conditions. Testing a particular initial or final condition consists simply in monitoring those plant parameters that together define the condition, comparing the parameter values to preset standards, which may be allowable ranges or specified valve or breaker positions, and determining whether the standards are met. If or when the tested condition is shown to be satisfactory, the verification process passes to the next condition in the programmed sequence or begins bypassing the check in a continuously executing loop. A generic flowchart building block that can be used in constructing the initial condition check portion of a system is shown in FIG. 3. This basic building block includes a step 70 which determines whether a bypass flag for this particular condition is set. If it is, the entire set of logic operations associated with this condition is bypassed. As a result, this flag allows an initial condition loop to only execute the logic for those conditions that are not satisfied. If the bypass condition is not set, the sensor signals, etc., for the condition are monitored 72 followed by a determination 74 as to whether the particular condition is satisfied. If the condition is not satisfied a detailed diagnostic display 76 is provided to the operator which will indicate the deficiency in satisfying the condition and the action necessary to correct the deficiency, along with an auditory tone if desired, and a branch is taken around the remainder of the logic in the block. This display should be designed to alert the operator by grabbing the operator's attention and could replace a display that would normally continuously be before the operator. The alerting of the operator should be an active rather than a passive operation. If the condition is satisfied a display 78 is produced which provides condition satisfaction confirmation to the operator and the bypass flag for this condition is set 80. Because the system is intended to minimally intrusive, this confirmation should not produce an audible tone or flashing display which would grab the operator's attention but is preferably something such as a single line textual confirmation line on a display that is otherwise used by the operator for a different purpose, is within the operator's field of vision and is generally continually before the operator. The confirmation should disappear after a brief period sufficient to allow the operator to check the confirmation if desired. This confirmation should be passive rather than active.

Problems in determining whether initial conditions are satisfied often arise from the incompleteness of the computer instrumentation data base. Written procedures covering nearly routine operations frequently contain requirements that the alignment of certain plant systems be verified before a transition in plant state is started. Verification of system alignment may translate into checking the positions of large numbers of valves and breakers, only a few of which are instrumented for transmission of information to the main control room/plant computer 10. Because of the infrequency with which such information is needed, as implied by the definition of nearly routine operations, providing a sufficient set of remote reading plant instrumentation would not be cost effective and, as a result, functions that could be done by a computer will remain in the province of a human. In this situation where the signals, etc., are not available to the computer 10, operator response, when appropriate, to high level questions such as "Has checklist 1 been completed?", displayed periodically by the computer 10, would be desirable for documentation purposes, but would also tend to make the system more obtrusive. However, with a modest amount of operator interaction, verification that all prescribed initial conditions are satisfied by having the operator input data can at least be documented by the present system. In such situations, the initial condition basic logic building block would take the form of FIG. 4.

In this basic building block, once the condition bypass flag is checked 90 the system immediately provides a display 92 to the operator which informs the operator of the condition that must be satisfied and requests positive operator response that the condition has been satisfied. Once again, this display should be designed to alert and get the operator's attention, and could be flashing or accompanied by an auditory signal. Once this display has been produced the system enters a timeout period which is calculated to provide the operator with sufficient time to provide the necessary positive response. If no positive response is produced a timed interrupt 94 will cause the process to exit this block without setting the condition bypass flag, so that the next time through the initial condition loop this display including the response request will be provided to the operator again. If the operator does provide a positive response, the exit from the interrupt 94 produces a display 96 which confirms the operators positive response and then sets 98 the condition bypass flag, so that the next time through the initial conditions loop this logic will be bypassed.

Figure 4:
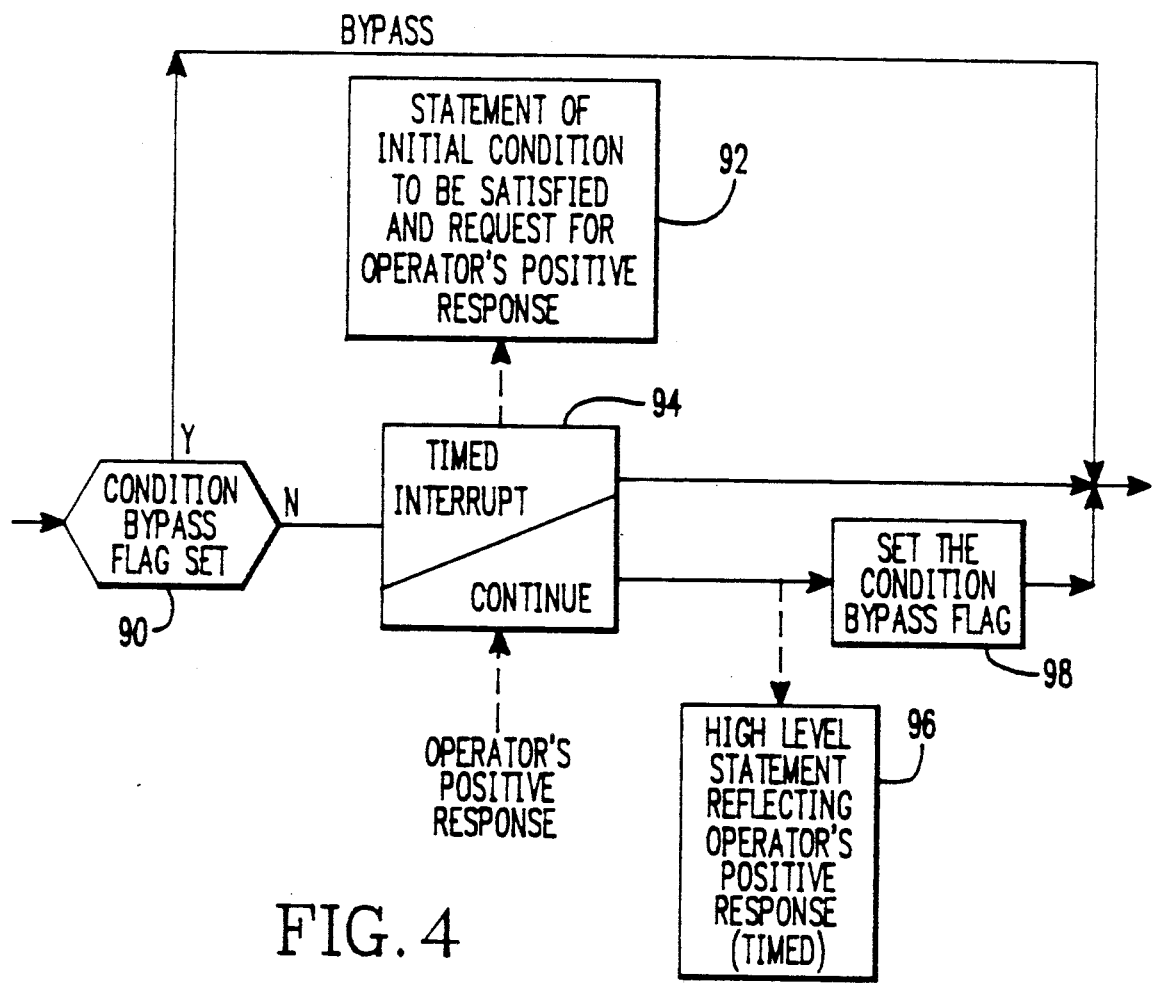
FIG. 4 is an alternate generic block for checking initial or final conditions.
Figure 5:
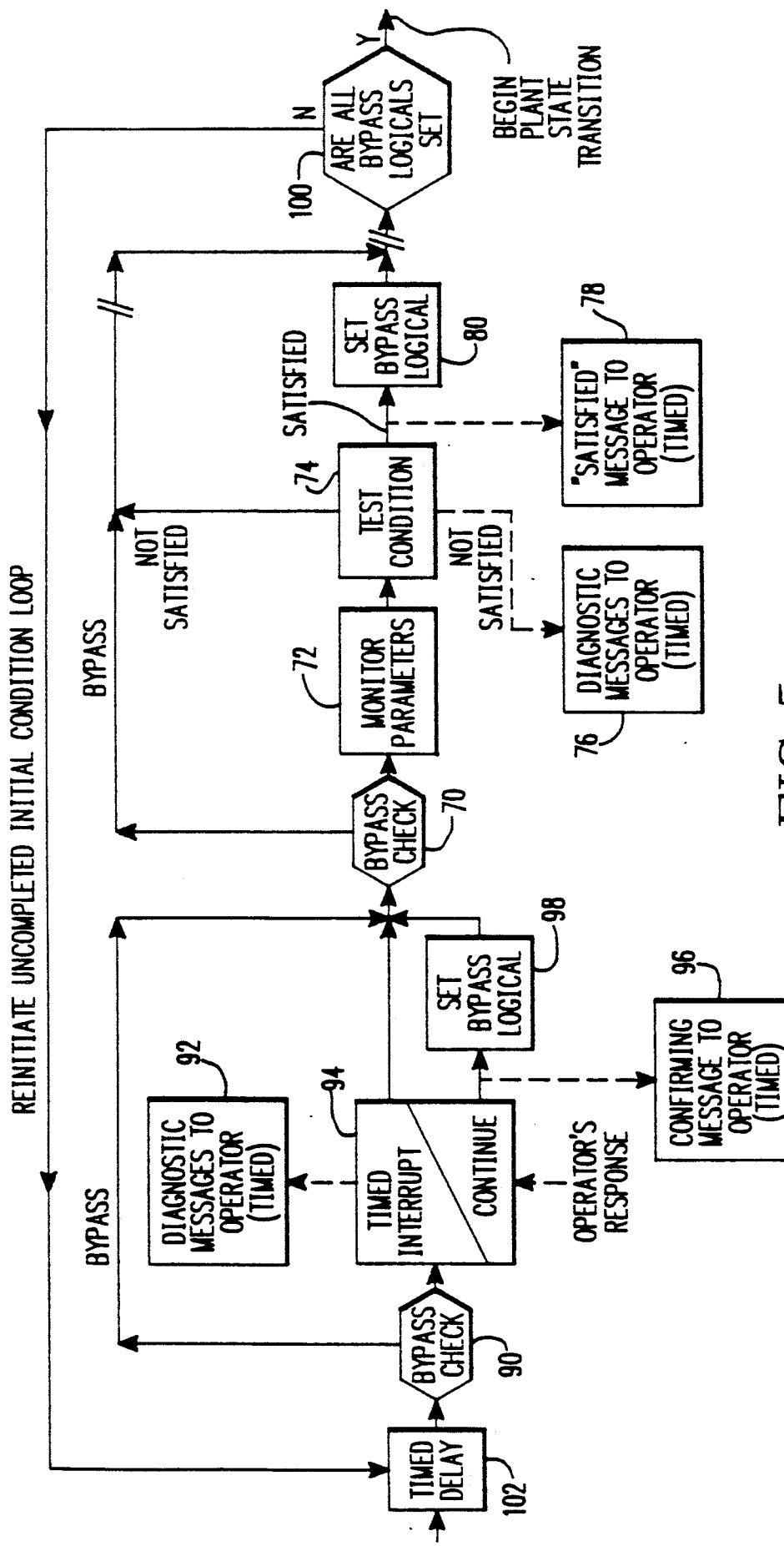
FIG. 5 illustrates a portion of an initial condition testing loop which requires that all conditions be set before proceeding.

As can be seen FIG. 5 is a combination of FIGS. 3 and 4 with a return loop which causes a return, when all the bypass flags are not set 100, to a timed delay or timeout 102 which should be set for a period which will allow the conditions in the plant to change sufficiently such that another cycle of initial condition monitoring is appropriate.

Success of the computer based operator support system of the present invention hinges on the ability of the system to pace itself through the prespecified sequence of plant state changes as the sequence unfolds. Steps such as block 100 in FIG. 5 and appropriate time-out periods allows the event monitoring and condition checking flow and the operations to be properly coordinated.

Since the prime concern of the plant operators in the nearly routine operations of interest here are transitions in plant state, the information necessary to monitor the transition process is usually available in the main control room, either as direct instrumentation readout or by voice communication from remote local work areas. In principle, any information available in the control room can be made available in the data base of a modern in-plant computer 10. At worst, data currently transmitted verbally from a remote work area (the turbine building or the chemistry lab, for example) can be input by the local operator with a few keystrokes at a workstation terminal at the completion of a task.

Figure 6:
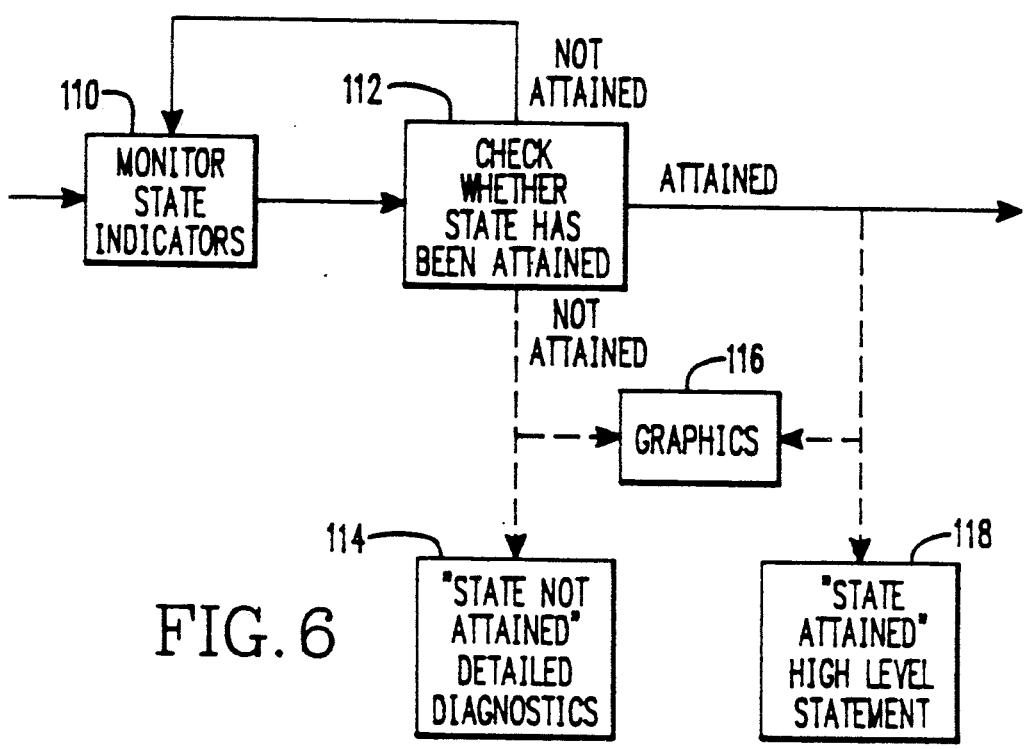
FIG. 6 is a generic flowchart building block for performing sequential condition tests.
Figure 7:
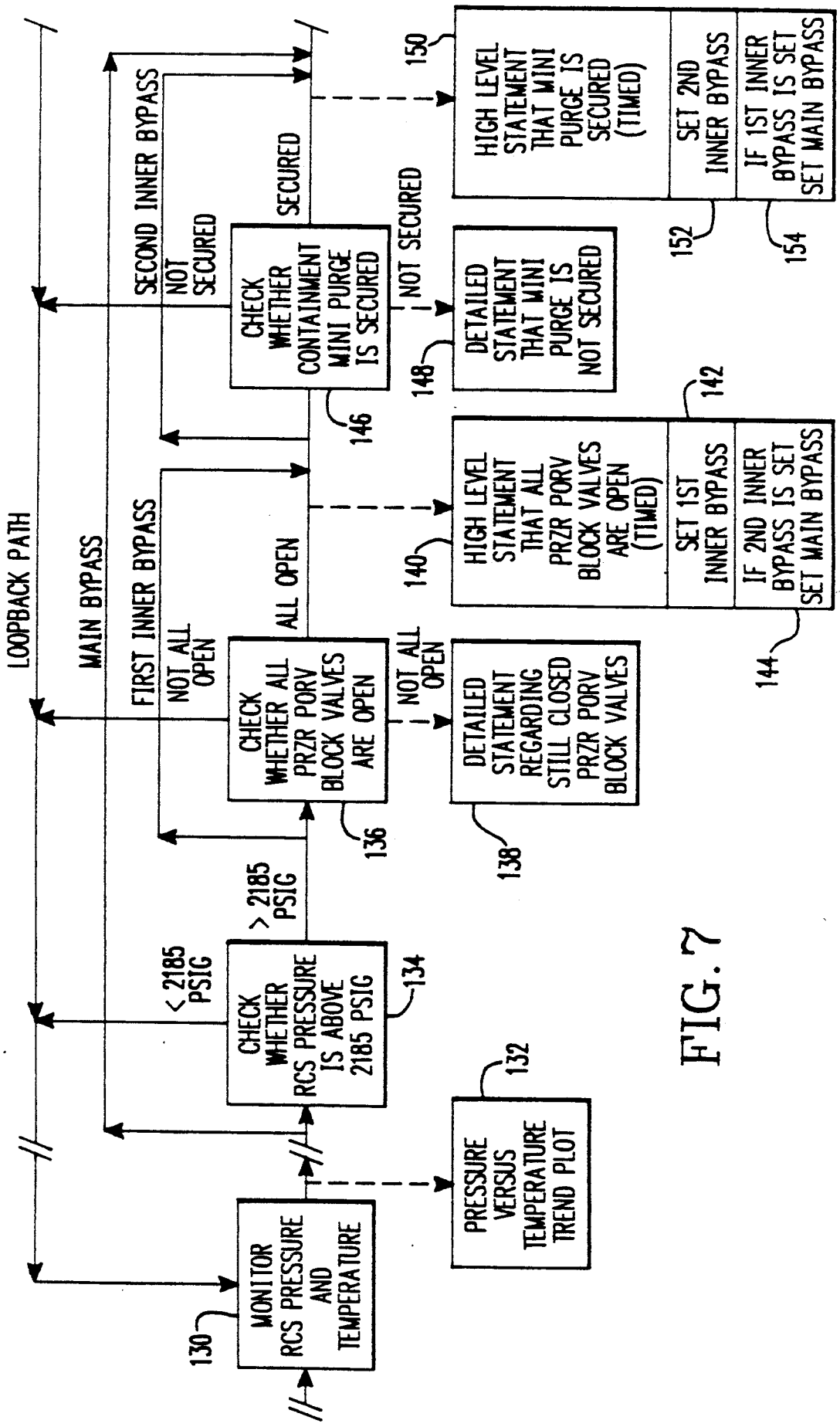
FIG. 7 depicts a more complex sequential condition check sequence.

A basic flowchart building block for tracking sequential conditions (the state transitions) is shown in FIG. 6. This basic building block first includes a step which monitors 110 the plant instrumentation. This step includes not only the typical monitoring of plant sensors but also the combining of sensor signals and other information, such as the results of chemical analysis from the chemistry lab to determine whether the state has been reached. Once the monitoring step is completed the determination 112 as to whether the state has been reached is performed. If the state has not been reached, the system produces a detailed alerting type diagnostic display for the operator explaining what components of the state have not been reached along with any graphics 116 which would aid the operator in moving the plant toward the desired state. If the state is not attained then a loopback to monitor 110 the state indicators is performed. Although not shown, it is possible to provide a time out period in the loop back path, so that the plant will have time to respond to any changes made by the plant operator in response to the alerting display 114 before the state indicators are again monitored. By providing the loopback to monitor when the condition is not satisfied, the system can insure that each condition is satisfied before the next sequential condition is tested. If the state is attained an appropriate display 118 can be provided to the operator along with associated graphics which will confirm to the operator 12 that the state has indeed been attained. The step 112 which determines whether the state has been attained can be much more complicated than it appears from FIG. 6. It may be necessary for the system designer to break the operation in step 112 into a number of condition checking steps before the ultimate determination can be reached. These conditions can be sequential as illustrated in FIG. 7 or even parallel like the initial conditions. An example of a situation where the step 112 has been broken down into a series of more simplified sequential condition checking steps is illustrated in FIG. 7.

In the example of FIG. 7 (as required in block 110) temperature and pressure are first monitored 130 and a trend plot is provided to the operator. Next the system determines, although not explicitly shown as a decision block, whether all of the conditions in this segment of the checking operation have been satisfied by checking a main bypass flag and, if so, a main bypass path is followed. If not, the computer 10 determines 134 whether the pressure satisfies a particular condition. If the pressure condition is not satisfied the flow is returned to the monitoring step 130. By requiring return to the monitoring step the condition of block 134 must be satisfied before the next sequential condition is satisfied. If satisfied the system does a check 136 on the position of a certain set of valves and if they are not all open an appropriate alerting type display 138 is provided to the operator followed by a loopback to the monitoring step 130. Prior to block 136 a bypass flag check, as in step 70, is implied for routing around step 136 when it has been satisfied. If the valves are all open the system provides an appropriate high level display 140 to the operator, sets 142 a first inner bypass flag so that the bypass check implied between steps 134 and 136 will cause step 136 to be bypassed if this flag is set. To convert a step such as 136 from a sequential condition to a parallel condition, the loopback path could instead be connected to enter the first inner bypass path after producing the appropriate display 138. The process then determines if the second inner bypass flag is also set 144, if so the main bypass flag is set so that the system will bypass the entire logic block.

Next, after impliedly checking the second inner bypass flag, the system performs a purge check 146, provides an appropriate alerting display 148 if the purge is not secured and loops back for another monitor cycle 130. If the purge is secured an appropriate display 150 is provided to the operator followed by setting 152 the second inner bypass flag and checking 154 on whether the first inner bypass flag is set and setting the main bypass flag if so, so that the next time through this block the main or second inner bypasses can be taken as appropriate. At the end of such a sequence of logic blocks a check (not shown), as in step 100, is made to confirm if all bypass flags have been set otherwise a loopback over the loopback path is performed. This allows the sequential condition loop to be cyclically performed until all checks are completed.

The sequence of steps of FIG. 7 illustrates the loop back/bypass logic that can be used during a prolonged, continuous change in plant state, in this case heat up and pressurization of the primary system of a pressurized water reactor. Note that while there is an implied (and real) flow of time from left to right, there is no explicit indication of time in the diagram. The evolution of plant states progresses at whatever rate the operators can achieve and the plant itself can safely tolerate.

Under the generic heading of constraining conditions all of the precautions, limitations, notes and so on that channel sequences of changes in plant state along safe routes are considered. Constraining conditions are seen to be passive unless violated; hence, there is no need to provide any information to the plant operator, unless, again, a violation has occurred or is impending. In that event the system must alert the responsible operator, indicate to him what the problem is by text or graphics, as appropriate, and secure his acknowledgment that he has been alerted. A typical flowchart basic building block for automatic constraint monitoring is set forth in FIG. 8. The monitoring process for constraint checking is simple and straightforward. Applicable constraints are almost universally spelled out in the written procedures provided to the plant operators and, as a result, the information needed to insure compliance with the constraints is available in the control room and, by implication, in a plant computer's database.

Figure 8:
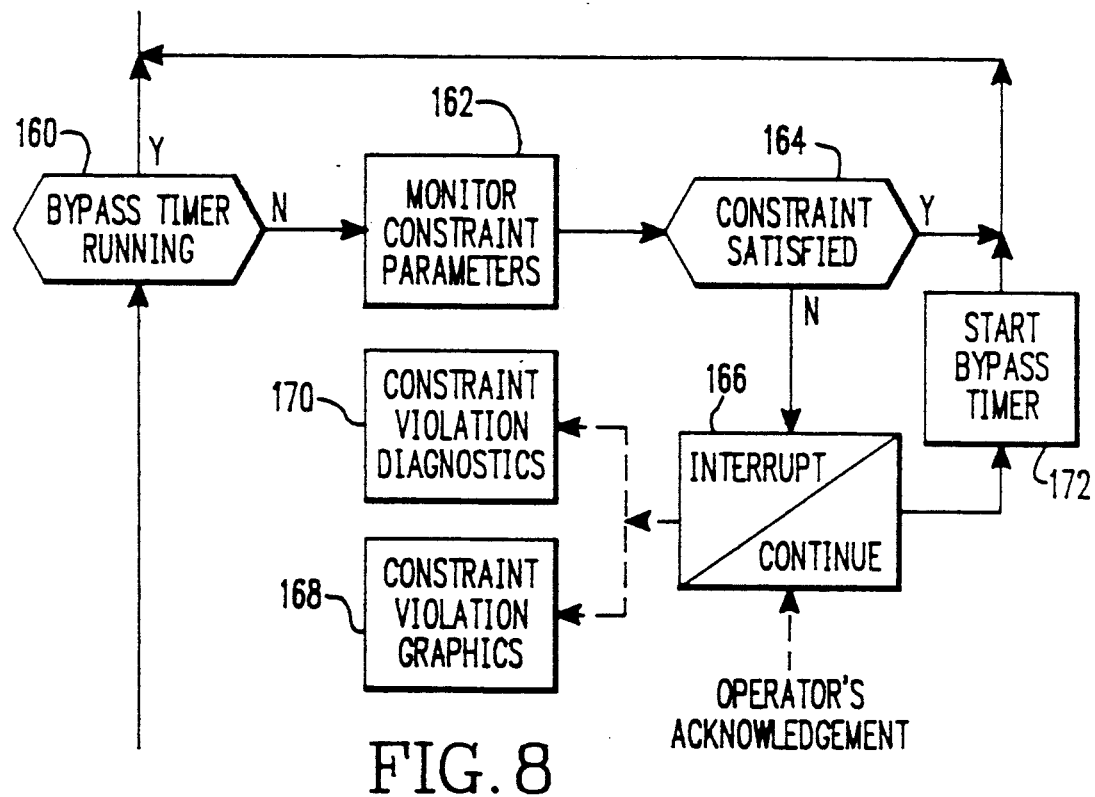
FIG. 8 is a basic building block flowchart for constraint monitoring.

The basic building block for automatic constraint monitoring illustrated in FIG. 8 further illustrates the feature of the present invention of being unobtrusive to the operator which is accomplished by only providing the constraint violation display to the operator and alerting him periodically and not continuously. The block provides this feature by bypassing the monitor and display logic if the bypass timer for this constraint is running. If the timer is not running the block monitors the constraint parameters 162 and determines 164 if the constraint is satisfied. If the constraint is not satisfied a timed interrupt block 166 is entered which produces constraint violation graphics 168 which will alert the operator (grab his attention) and appropriate diagnostics 170 (along with an audible signal, if desired) and waits for the operator to acknowledge the constraint violation. When the constraint violation is acknowledged the logic continues through the step of setting 172 the bypass timer. The time out value of the bypass timer should be set at a fraction of the time it takes for the constraint violation to begin causing serious damage or expense.

Figure 9:
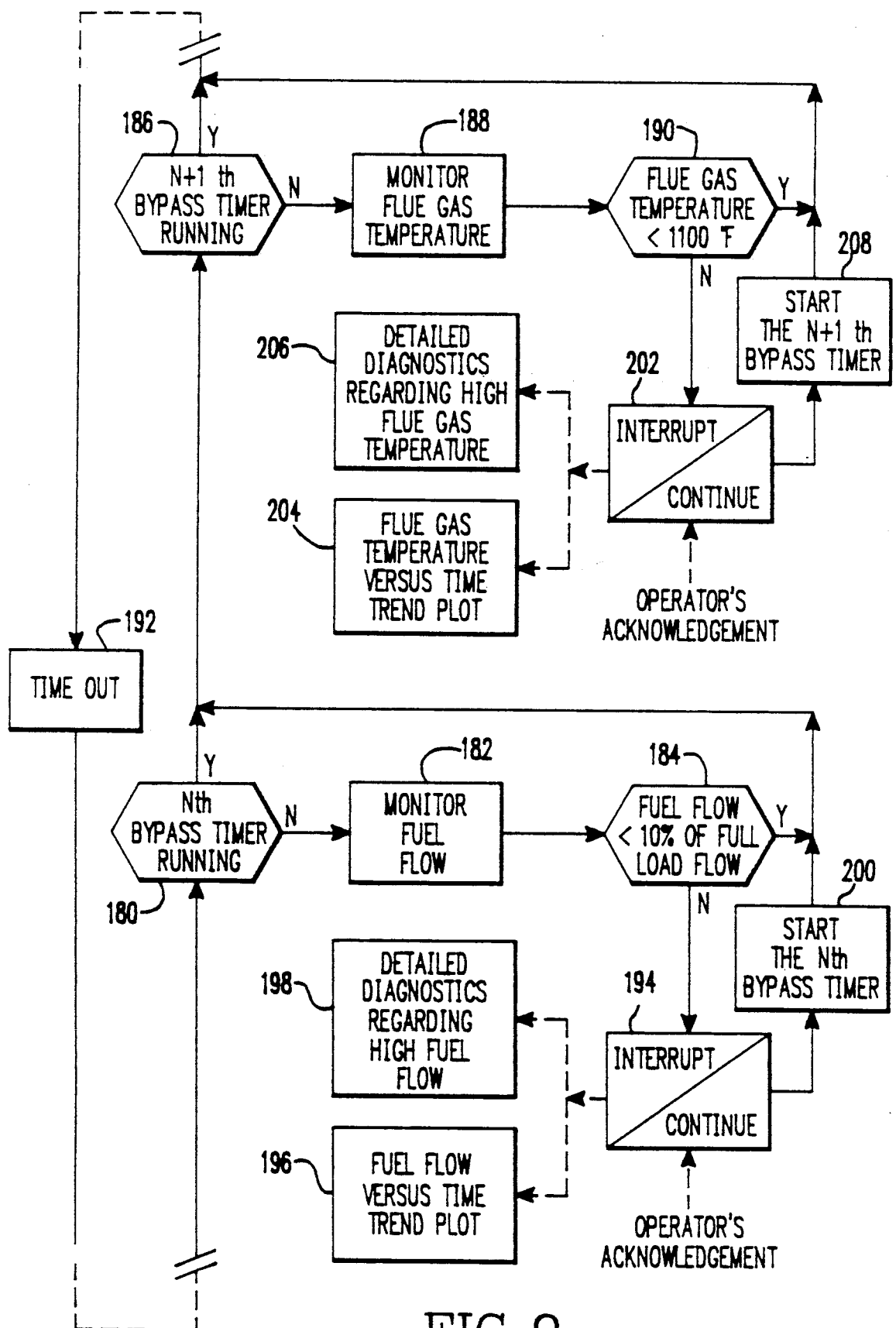
FIG. 9 illustrates a loop of constraint checks.

Because the constraints are applicable throughout the entire operation, whenever the bypass timer is not running the constraints are monitored and tested. The constraint monitoring logic diagrams are organized as stacks of basic building blocks assembled to form continuous loops as illustrated in FIG. 9. All applicable constraining conditions are to be tested in each pass through a loop if not bypassed by a timer being set. The monitoring and checking loop consists of checking 180 whether the n-th bypass timer is running, if not monitoring 182 fuel flow, determining 184 if the fuel flow is running at a certain value, determining 186 whether the n+1th bypass timer is running, if not monitoring 188 the flue gas temperature, determining 190 whether the flue gas temperature is a certain value and then returning through a time out block 192 to execute the loop again. The timeout block 192 time out period could be set at, for example, 30 seconds. If the conditions associated with monitoring the fuel flow are not satisfied the system produces a timed interrupt 194 along with appropriate graphics 196 and diagnostics 198 and awaits operator acknowledgement before continuing to start 200 the respective bypass timer. The failure to satisfy the fuel gas constraints provides a similar sequence 202-208. As can be seen the monitoring and checking loop itself is interrupted only by detection of an existing or impending violation and only until the operator's acknowledgment is received. On receiving the operator's acknowledgement a dedicated bypass timer is set. Thereafter, testing of that particular constraint is bypassed on successive passes through the loop until the bypass has timed out to avoid distracting the operator with a repetitive message of which he is already aware. Passes through a loop are to be initiated periodically, perhaps every few seconds or every minute during a nearly routine operation.

Figure 10:
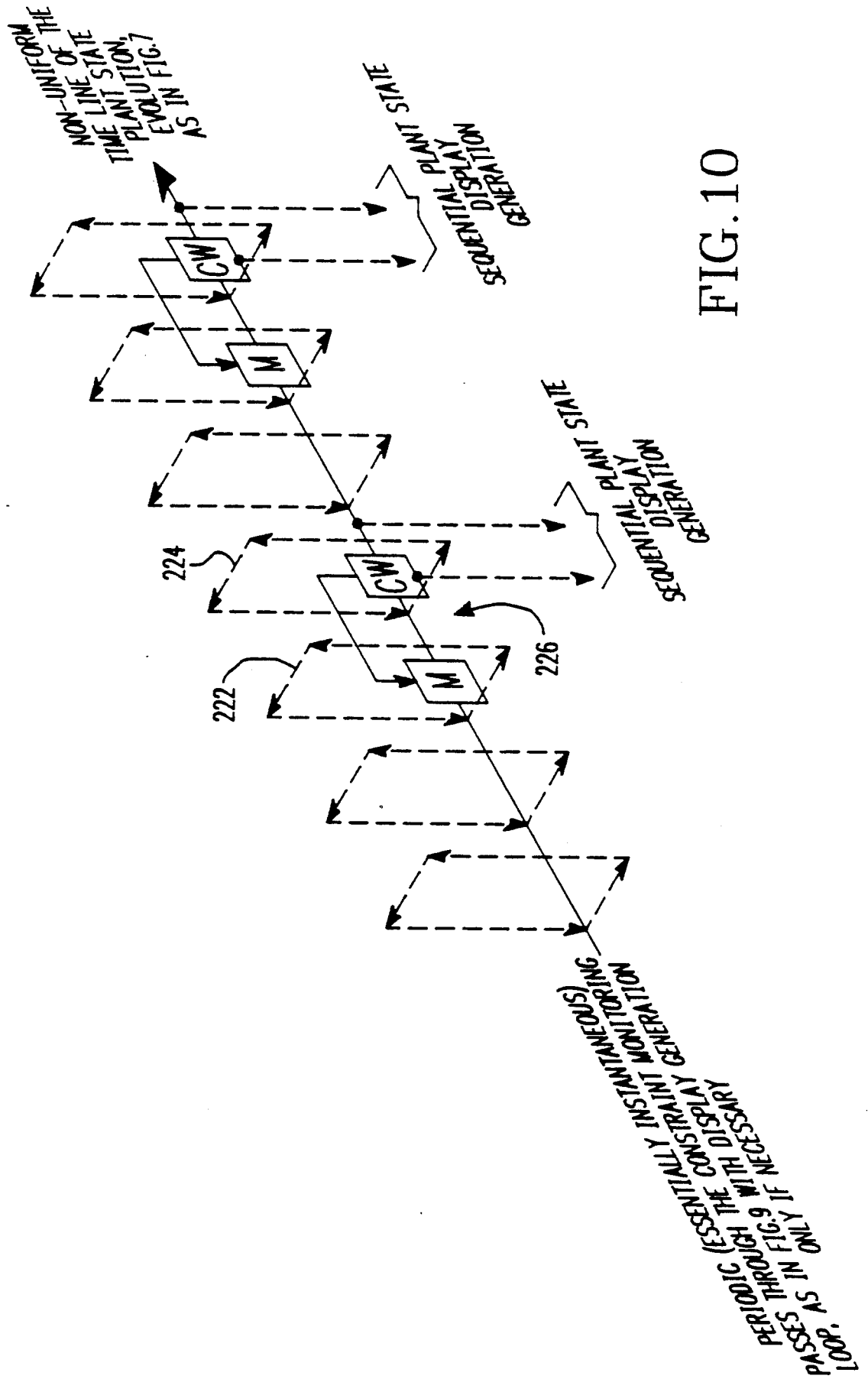
FIG. 10 depicts a combination of sequential condition and constraint checks.

Achieving specified plant states as identified in stepping through the sequential conditions logic can be used to trigger adding or deleting individual constraint monitoring building blocks. This can be accomplished by requiring that a sequential condition be met before the constraint is tested. That is the output of block 112 could logically flow to a constraint block. In FIG. 10, the loops 222-224 represent constraint block executions while the loop 226 represents a sequential condition block conditionally calling constraint blocks 222 and 224. Since constraints tend to be in force through much or all of a given evolution and since no display generation is needed or wanted under normal circumstances, execution of a loop can be nearly instantaneous with a modern computer, it appears to be practical to, in effect, lift the constraint monitoring task out of the time domain in which the sequential conditions exist and produce a combination of sequential condition executions and constraint executions as illustrated in FIG. 10.

The alerting and confirmation displays produced by the present invention can be created by those of ordinary skill in the art. Preferably text is used to inform the operator that a given component, parameter or system is or is not in the correct state. It should be noted that according to the objectives of the present invention it is quite possible that an operator would never look at the text that states that all is in order, and so such displays should appear for short intervals of time and then disappear. In some cases, this textual information alone will be sufficient. However, particularly in cases where something is amiss, additional information should be presented to the operator and should be graphic in nature. The graphic displays may appear in several forms. Graphic depictions of functional processes portray to the operator the purpose of a system, irrespective of the exact physical configuration. Graphic depictions of physical processes are true to the piping and instrumentation layouts of the plant. Each of these graphic forms presents a different viewpoint to the operator, a viewpoint which the operator may require at a particular stage of the plant maneuver. Appropriate selection of the type of functional graphics can be specified by the system designer. Other graphic displays which may prove to be useful are parameter versus time displays and trajectory displays in which one parameter, pressure, for example, is plotted against another, such as temperature. These types of displays are particularly useful during startup and shutdown activities for a power plant, since it is very desirable for parameters to follow either time-dependent trajectories or to follow other parameters during these events.

An example of the workings of the automatic system of the present invention for monitoring the execution of procedures can be found by examining how the system would track the process of taking a large nuclear power reactor critical by control bank withdrawal. The operator's actions, as defined by the pertinent written procedure, consist generally of: 1) Selecting the size of the next movement of the control bank. 2) Making the decided upon adjustment in control bank position, concurrently closely monitoring the rate of change of source range count rate and control rod positions to insure that controlling plant technical specifications are satisfied. 3) Observing the resulting time dependent change in source range count rate following the control bank movement. 4) Recording the final stable count rate, assuming the count rate stabilizes, and using the reading of final count rate to compute the value of a parameter called the inverse count rate ratio (i.e. the ratio of a reference count rate taken earlier, divided by the current stabilized count rate) and plotting the value of the ratio against bank position on a two dimensional graph. (The ratio plot has the well known property that successive points, corresponding to progressively farther withdrawn bank positions, will trend steadily toward the horizontal axis and will fall precisely on the horizontal axis, i.e. the ratio=0.0, when criticality is established). 5) Evaluating the most recent few points on the ratio plot, judging at what control bank position criticality will occur and returning to step 1. At some point in the process the count rate will fail to stabilize following a control bank movement and will instead tend to increase exponentially, indicating that the core is now slightly supercritical. When this condition is clearly identified the operator should insert the control bank enough to stop the exponential rise in count rate, and that part of the procedure will have been completed.

A computer programmer's flow chart for the part of the procedure execution monitor system dedicated to monitoring the particular operation described above is shown in FIGS. 11A-11C. This figure also shows what would be considered appropriate displays for alerting the operator concerning deviations from the procedure and confirming normal operations. Displays 238 and 264 which include imperative statements are examples of alerting type displays while displays 254 and 298 are examples of confirmatory displays. Note that the monitor operates completely automatically with no need for input from the human operator. Progress through the flow chart and selection of displays to be generated is controlled by three internal triggers: a) detection of control bank movement; b) determination that count rate is rising exponentially; and c) determination that count rate is no longer changing.

Figure 11A:
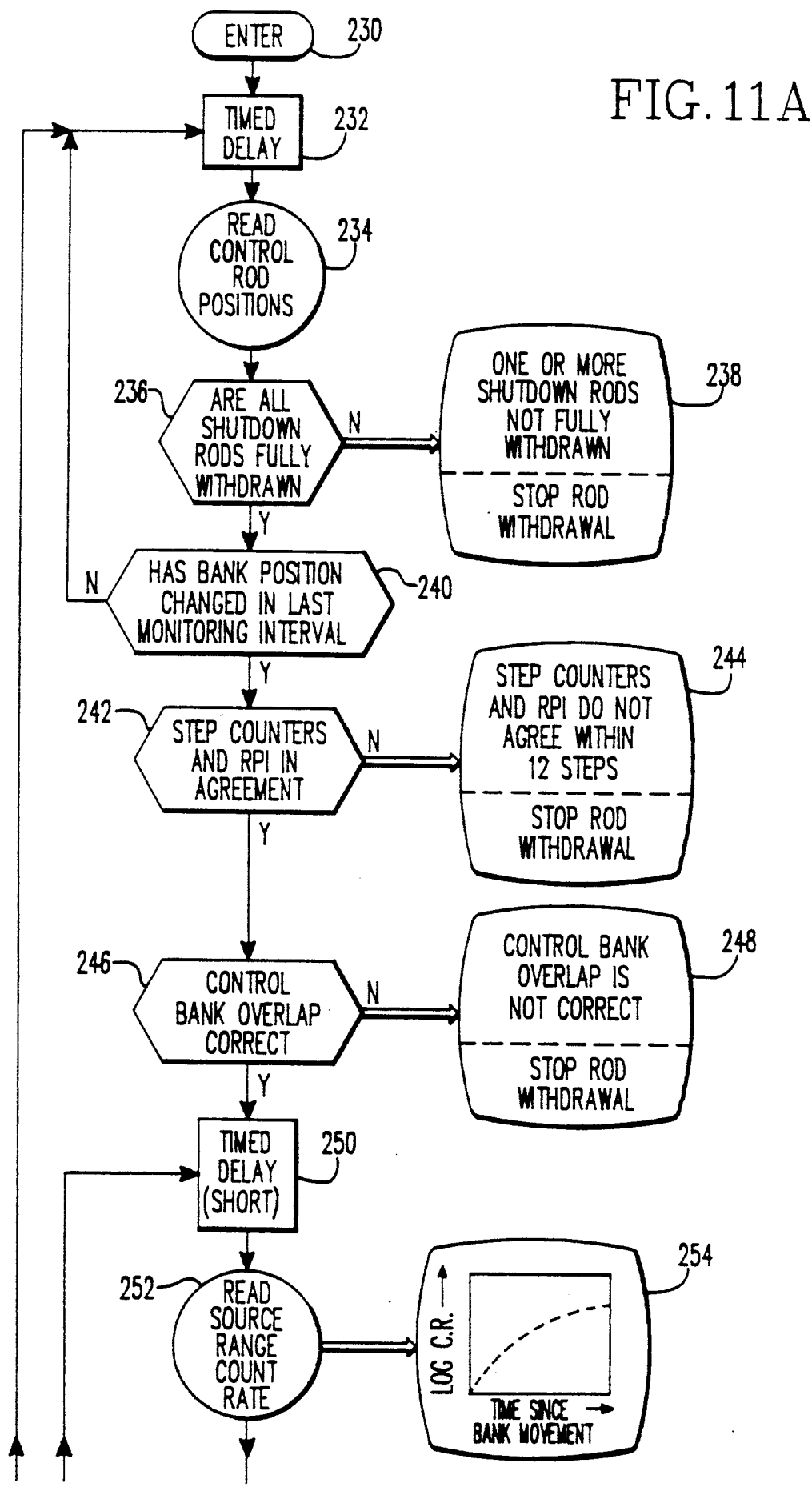
FIGS. 11A–11C illustrate the system of the present invention applied to a procedure.
Figure 11B:
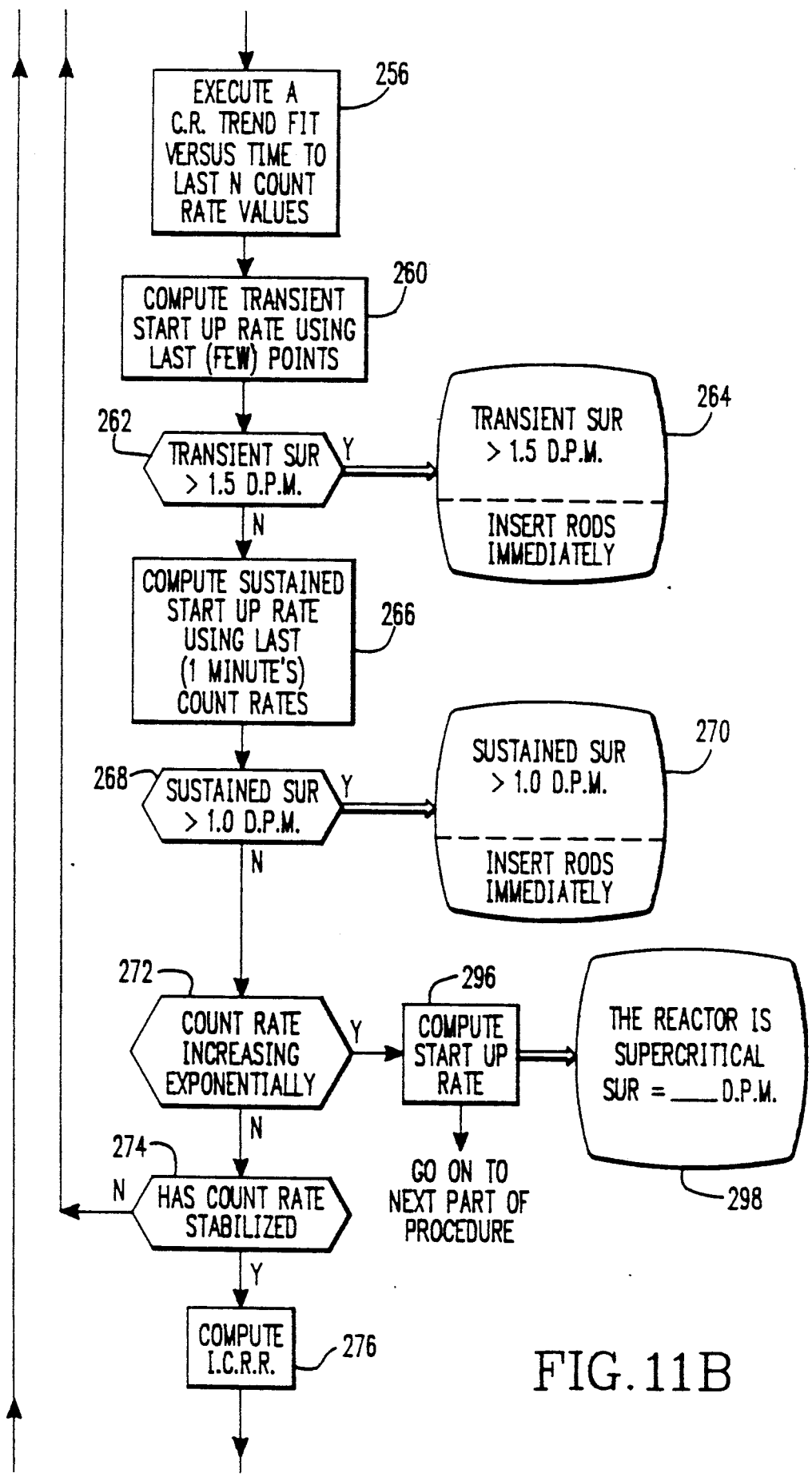
Figure 11C:
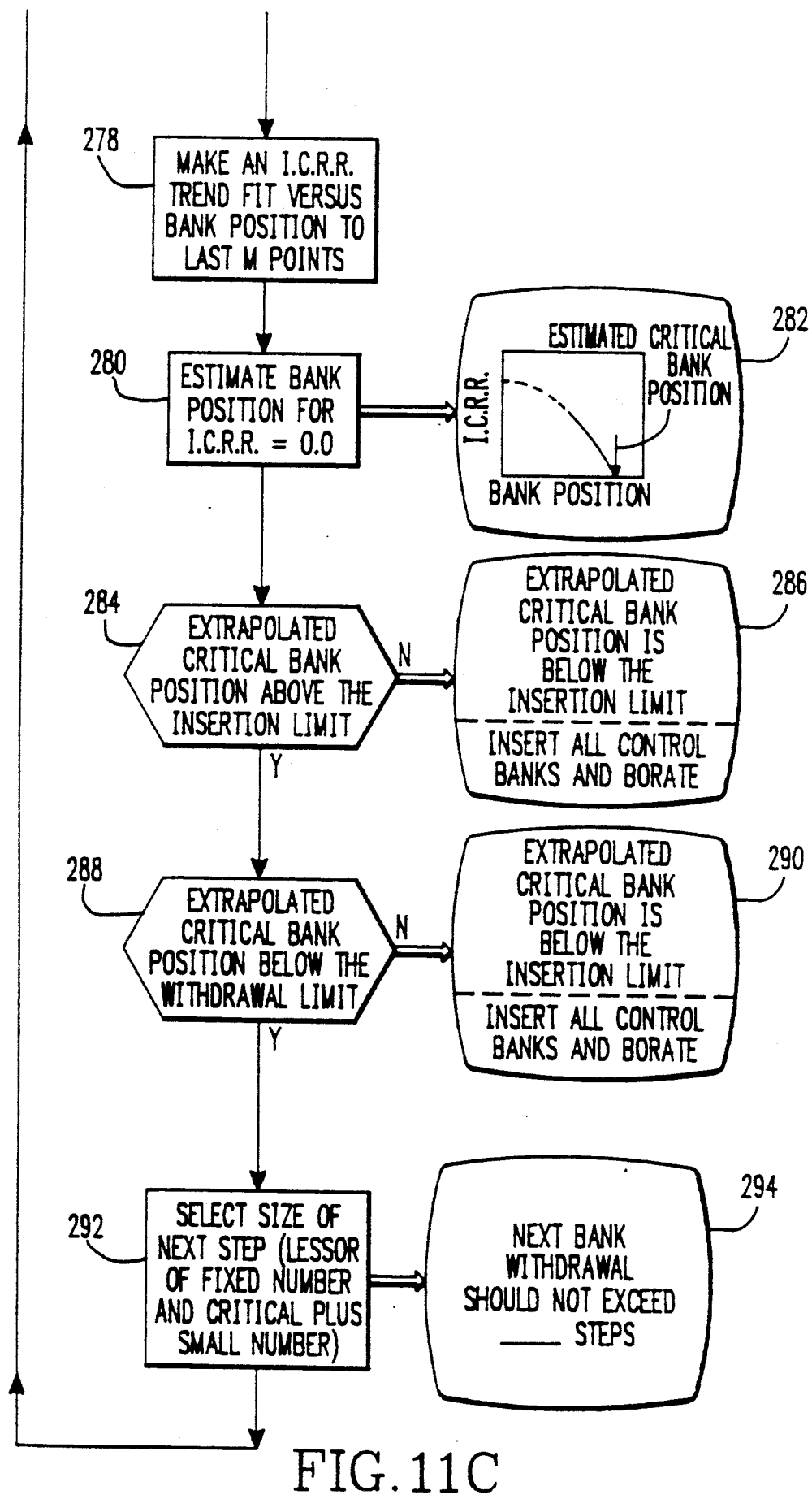

Implied in the flow chart of FIGS. 11A-11C, but not explicitly shown, is the potential for segregating the constraining condition type checks made as control rod withdrawal proceeds into a separate concurrently running computer task. Thus, by well known methods such checks as "Are the shutdown rods fully withdrawn?" or "Are step counters and RPI (rod position indicators) in agreement?" could be executed by a separate, periodically executed computer task running in parallel with the sequential control rod withdrawal process monitor rather than having these checks called by the main process flow as in FIG. 10.

Using a monitoring system for the process as described above provides valuable information efficiently to the operator and potential errors in procedure execution (for example, withdrawal of a control bank too many steps, leading to an unacceptably high startup rate) are detected without imposing on or interfering with the operator's normal actions.

A more detailed procedure and the flowchart which could result therefrom is attached as the microfiche appendix.

In a number of complex processing facilities, operations such as plant startup, for example, are carried out in part under the control of operators at the main control board in the central control room and in part under the control of operators at local control panels dispersed throughout the facility. Frequently, information relating to the start of various plant systems is available at one or another of the local control panels but not in the central control room. It is evident by simple extrapolation of the principles described above that the local control panels could be equipped with local, dedicated computers that are programmed to monitor locally available information and to track the progress of the execution of procedures involving plant systems controlled from the respective control panels. Single communications links coupling the individual local computers to the main central computer in the control room would then be used to convey to the central computer information regarding the completion of locally executed procedures that are nested in encompassing procedures executed from the main control room. Thus, the execution of procedures or operations involving both central and local control of systems can be comprehensively monitored without imposing excessive input requirements on the central monitoring computer. Alternatively, the respective local computers could interact with a data highway system to pass relevant information to the central computer.

As can be seen from the above description the conventional written procedures provided to plant operators to guide them, as necessary, in carrying out such nearly routine operations also serve as effective guides in developing the high level logic flowcharts that facilitate the transition from certain nominally cognitive human tasks to rule-based computer tasks. Resolution of the written procedures by a specialist in plant operations into initial conditions, sequential conditions, constraining conditions and final conditions, all recognizable by the computer, follows straightforwardly.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalence may be resorted to, falling within the scope of the invention.

What is claimed is:

1. A method of monitoring preplanned state changes carried out in accordance with a procedure including a preplanned sequence of operations performed by an operator, comprising the steps of:
   (a) monitoring actual size changes;
   (b) comparing the actual state changes with the preplanned state changes of the operations; and
   (c) alerting the operator only when the actual state changes indicate a deviation from the preplanned operations of the procedure.

2. A method as recited in claim 1, further comprising the step of (d) requiring operator acknowledgement of the deviation.

3. A method as recited in claim 1, further comprising the steps of:
   (d) monitoring changes caused by the operator to correct the deviation; and
   (e) confirming to the operator that the deviation is corrected.

4. A method of monitoring state changes in a power plant carried out in accordance with preplanned operations of a procedure performed by an operation, comprising the steps of:
   (a) monitoring the state changes;
   (b) comparing the changes with the operations of the procedure;
   (c) confirming to the operator when the changes match the preplanned operations of the procedure;
   (d) alerting the operator when the changes indicate a deviation from the operations;
   (e) requiring operator acknowledgement of the deviation;
   (f) monitoring changes caused by the operator in response to the deviation alert; and
   (g) confirming to the operator that the deviation has been corrected.

5. An apparatus for monitoring state changes performed by an operator in accordance with preplanned operations of a procedure, comprising:
   monitoring means for detecting the state changes;
   checking means for determining whether the changes are deviating from the preplanned operations of the procedure; and
   display means for providing a visual alert of the deviation to the operator.

6. A method of monitoring state changes conducted by preplanned operations of a procedure performed by an operator, comprising:
   (a) monitoring the state changes caused by the operator;
   (b) determining whether initial conditions of the preplanned operations of the procedure are satisfied;
   (c) alerting the operator that the initial conditions are not satisfied with an attention getting display and an audible sound and monitoring the changes until the initial conditions are satisfied;
   (d) confirming to the operator that the initial conditions are satisfied;

(e) determining whether sequential conditions of the preplanned operations of the procedure are satisfied;

(f) alerting the operator that the sequential conditions of the procedure are not satisfied;

(g) looping back for determining whether each sequential condition is satisfied until each sequential condition is satisfied and bypassing sequential conditions that are satisfied;

(h) confirming to the operator sequential conditions that are satisfied;

(i) determining whether constraining conditions of the preplanned operations of the procedure are satisfied;

(j) periodically alerting the operator that the constraining conditions are not satisfied; and (k) requiring operator acknowledgement of the unsatisfied constraining conditions.

7. A method as recited in claim 6, wherein step (d) comprises the steps of:

(1) monitoring the changes;

(2) determining whether each initial condition is satisfied;

(3) confirming each initial condition that is satisfied; and (4) bypassing steps (1)-(3) for each initial condition that is satisfied.

8. A method as recited in claim 6, wherein step (f) comprises monitoring and determining whether a sequential condition is satisfied before proceeding to a next sequential condition.

9. A method as recited in claim 6, wherein step (c) includes requiring operator input that one of the initial conditions is satisfied.

* * * * *